(12) United States Patent
Sato et al.

(10) Patent No.: US 11,031,658 B2
(45) Date of Patent: Jun. 8, 2021

(54) BUS BAR MODULE AND BATTERY PACK

(71) Applicant: Yazaki Corporation, Tokyo (JP)

(72) Inventors: Katsunori Sato, Shizuoka (JP); Yoshiaki Ichikawa, Shizuoka (JP); Takao Shoji, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 128 days.

(21) Appl. No.: 16/351,663

(22) Filed: Mar. 13, 2019

(65) Prior Publication Data

US 2019/0288266 A1 Sep. 19, 2019

(30) Foreign Application Priority Data

Mar. 14, 2018 (JP) .............................. JP2018-046458

(51) Int. Cl.
*H01M 50/502* (2021.01)
*H01M 50/20* (2021.01)
*H01M 50/543* (2021.01)

(52) U.S. Cl.
CPC ......... *H01M 50/502* (2021.01); *H01M 50/20* (2021.01); *H01M 50/543* (2021.01); *H01M 2220/20* (2013.01)

(58) Field of Classification Search
CPC ............. H01M 2/206; H01M 2220/20; H01M 2/1083; H01M 2/30
See application file for complete search history.

(56) References Cited

U.S. PATENT DOCUMENTS

2011/0287299 A1 11/2011 Kim
2014/0212732 A1* 7/2014 Ichikawa .............. H01M 2/206
429/158

FOREIGN PATENT DOCUMENTS

JP 2015065055 A 4/2015
JP 2016-129125 A 7/2016

OTHER PUBLICATIONS

Communication dated Jun. 4, 2019, from the European Patent Office in counterpart European Application No. 19162063.2.

* cited by examiner

*Primary Examiner* — Basia A Ridley
*Assistant Examiner* — Heng M. Chan
(74) *Attorney, Agent, or Firm* — Sughrue Mion, PLLC

(57) ABSTRACT

A bus bar module includes a plurality of bus bars and a bus bar holder. The bus bar holder is constituted by coupling a plurality of holding portions in a chain manner via deformable coupling portions, respectively, the plurality of holding portions each holding the bus bar in a movable manner in predetermined ranges determined by restriction of movement of the bus bar by interferences with movement restricting members. Openings allowing two contact portions of the bus bar held by the holding portion to be exposed to an outside, the two contact portions being respectively connected to the electrodes of the two adjacent battery cells, are provided in either the holding portion or the coupling portion.

8 Claims, 9 Drawing Sheets

BUS BAR MODULE AND BATTERY PACK

BACKGROUND

1. Technical Field

The present invention relates to a battery pack in which terminals of a plurality of battery cells are connected by a bus bar module.

2. Related Art

For example, a battery mounted in an electric vehicle such as an electric vehicle (EV) or a hybrid vehicle (HEV) has a larger capacity than a battery mounted on an ordinary vehicle having an internal combustion engine as a propulsion source.

In a battery of this type, the large capacity is realized by using a battery pack in which electrodes of a large number of battery cells constituting a battery module are connected by a bus bar. Since a large current flows through this bus bar, the bus bar needs to have a certain thickness.

In addition, to suppress a contact resistance, the bus bar needs to sufficiently adhere to the electrodes of the battery cells of the battery module. However, the positions of the electrodes of the battery cells may vary due to dimensional errors within a tolerance of the battery cells. Therefore, the bus bar needs to apply a load toward the electrodes so as to adhere to any of the electrodes.

Therefore, when a long bus bar connecting electrodes of many battery cells is used, dimensional errors of the battery cells overlap and variation in the positions of the electrodes to which the bus bar adheres become large, and the load applied to the bus bar may needs to be made large. In that case, a larger load is applied to the electrode close to the bus bar than the electrode distant from the bus bar, which may cause damage to the battery cell.

According to JP 2016-129125 A, reduction of the length of a bus bar by connecting electrodes of two adjacent battery cells by one bus bar has been proposed. In this proposal, it is only the electrodes of the two adjacent battery cells that the one bus bar adheres to.

Therefore, it is not necessary to apply a load to the bus bar like the long bus bar to adhere to the electrodes of many battery cells. In addition, since the posture of the bus bar can be changed according to the positions of the electrodes of the two adjacent battery cells, the bus bar can be easily brought to adhere to the electrodes.

SUMMARY

However, in the bus bar according to JP 2016-129125 A, when attaching the bus bars to the electrodes of the battery cells, respectively, each bus bar needs to be arranged between the electrodes of the two adjacent battery cells. Such arranging work is very complicated as compared with arranging work of a long bus bar that connects electrodes of many battery cells at a time, and becomes a cause of a rise in manufacturing cost.

The present invention has been made to solve the above problems, and an object of the present invention is to provide a bus bar module capable of securing adhesiveness of a bus bar to electrodes of battery cells having variation in positions without impairing assemblability of the bus bar to electrodes of many battery cells constituting a battery module and, and a suitable battery pack using the bus bar module.

A bus bar module according to the present invention includes a plurality of bus bars each connecting electrodes of two adjacent battery cells of a large number of battery cells constituting a battery module, and a bus bar holder constituted by coupling a plurality of holding portions in a chain manner via deformable coupling portions, respectively, the plurality of holding portions each holding the bus bar in a movable manner within a predetermined range determined by restriction of movement of the bus bar by an interference with a movement restricting member, and having openings provided in either the holding portion or the coupling portion, the openings allowing two contact portions of the bus bar held by the holding portion to be exposed to an outside, the two contact portions being respectively connected to the electrodes of the two adjacent battery cells.

In the bus bar module according to the present invention, the holding portion may include a support plate that supports a portion of the bus bar except the contact portions, and a pair of side walls erecting from the support plate, extending on both sides of the bus bar, and facing each other, and the movement restricting member may include a pair of protrusions projecting from facing surfaces of the side walls, respectively, and the bus bar that has climbed over the pair of protrusions, has moved toward the support plate, and has been held by the holding portion, may be movably held in an interval direction of the support plate and the protrusions between the support plate and the pair of protrusions.

Further, in the bus bar module according to the present invention, the coupling portion may be connected to the support plate, and the support plate and the coupling portion may be arranged in a place facing a portion between the two contact portions of the bus bar held by the holding portion.

Further, in the bus bar module according to the present invention, the movement restricting member may be arranged at a position allowing a gap to be provided between the movement restricting member and the bus bar on the support plate, the gap allowing inclination of the bus bar with respect to the support plate.

Further, in the bus bar module according to the present invention, the holding portion may include a support plate that supports a portion of the bus bar except the contact portions, the movement restricting member may include a positioning pin projecting from the support plate and loosely inserted in a guide hole in the bus bar on the support plate, and the bus bar may be movably held along the support plate until the guide hole abuts against the positioning pin.

Further, a battery pack of the present invention may include a battery module constituted by a large number of battery cells, and the bus bar module as described above.

According to the present invention, adhesiveness of a bus bar to electrodes of battery cells having variation in positions can be secured without impairing assemblability of the bus bar to electrodes of many battery cells constituting a battery module.

DETAILED DESCRIPTION

Figure 1:
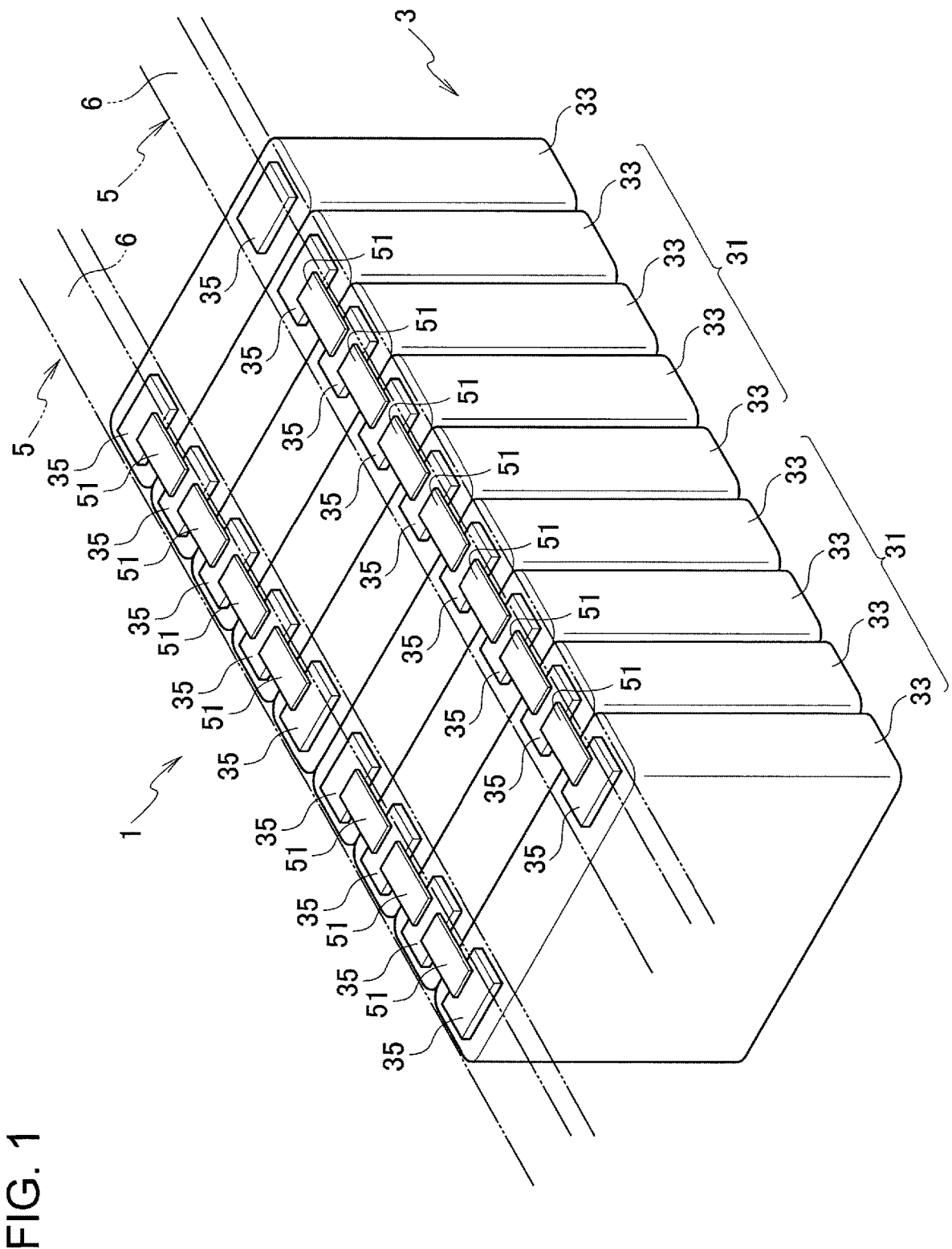
FIG. 1 is a perspective view illustrating a schematic configuration of a battery pack according to an embodiment of the present invention.

Hereinafter, embodiments of the present invention will be described with reference to the drawings. FIG. 1 is a perspective view illustrating a schematic configuration of a battery pack according to an embodiment of the present invention. A battery pack 1 illustrated in FIG. 1 includes a battery module 3 and a bus bar module 5.

The battery module 3 is constituted by a large number of battery cells 33. Each of the battery cells 33 includes a pair of electrodes 35 and 35 of a positive electrode and a negative electrode at both ends in a longitudinal direction of a rectangular top surface. The battery cells 33 are arranged such that long sides of the top surfaces are in contact with one another.

FIG. 1 illustrates a case in which four battery cells 33 connected in parallel constitute one unit cell 31, and a plurality of the unit cells 31 is connected in series to constitute the large-capacity battery module 3. The bus bar module 5 illustrated in FIG. 1 is used for connection between the electrodes 35 on one end side in the longitudinal direction of the top surfaces of the battery cells 33 and for connection between the electrodes 35 on the other end side.

Figure 2:
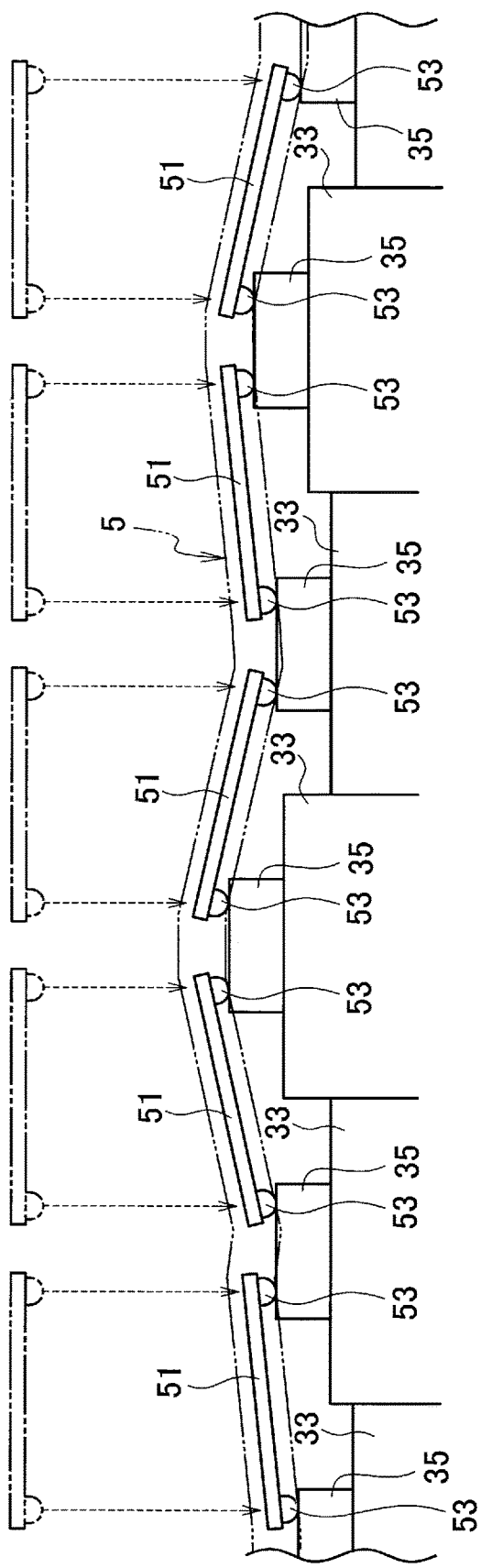
FIG. 2 is an explanatory view illustrating a connection state between electrodes by a short bus bar used for connection between electrodes of adjacent battery cells in a case where variation in electrode positions due to a dimensional tolerance of the battery cells in FIG. 1 is absorbed by the bus bar.

Each of the battery cells 33 of the battery module 3 illustrated in FIG. 1 may include a dimensional error within a tolerance. If each battery cell 33 has the dimensional error, for example, as illustrated in the explanatory view in FIG. 2, the position of the electrode 35 in a height direction of each battery cell 33 varies.

Therefore, when connecting the electrodes of the plurality of battery cells 33 by one bus bar, the bus bar cannot sufficiently adhere to the electrode 35 of the battery cell 33 lower in height than the other battery cells 33 to suppress a contact resistance.

Therefore, the electrodes 35 and 35 of two adjacent battery cells 33 and 33 are connected by an individual bus bar 51. Specifically, hemispherical contact portions 53 respectively projecting near both ends in a longitudinal direction of a back surface of the rectangular bus bar 51 are respectively brought into contact with the electrodes 35 and 35 of the two adjacent battery cells 33 and 33, thereby to electrically connect the both electrodes 35 by the bus bar 51.

By using the individual bus bar 51 for connection of the electrodes 35 and 35 of the two adjacent battery cells 33 and 33 in this manner, the contact portions 53 of each bus bar 51 can be brought to sufficiently adhere to the electrodes 35 of the plurality of battery cells 33 having variation in height.

However, if using the individual bus bar 51 for connection of the electrodes 35 and 35 of the two adjacent battery cells 33 and 33, each bus bar 51 needs to be arranged between the electrodes 35 and 35 of the two adjacent battery cells 33 and 33. As a result, arranging work of the bus bar 51 requires much labor and cost as compared with a case of connecting electrodes of a plurality of battery cells 33 by one bus bar.

Therefore, in the present invention, the plurality of bus bars 51 each connecting the electrodes 35 and 35 of the two adjacent battery cells 33 and 33 is held by a common bus bar holder to constitute the bus bar module 5. With the configuration, the bus bars 51 can be collectively arranged between the electrodes 35 and 35 to be connected at once. Hereinafter, a specific example of the bus bar module 5 will be described.

Figure 3:
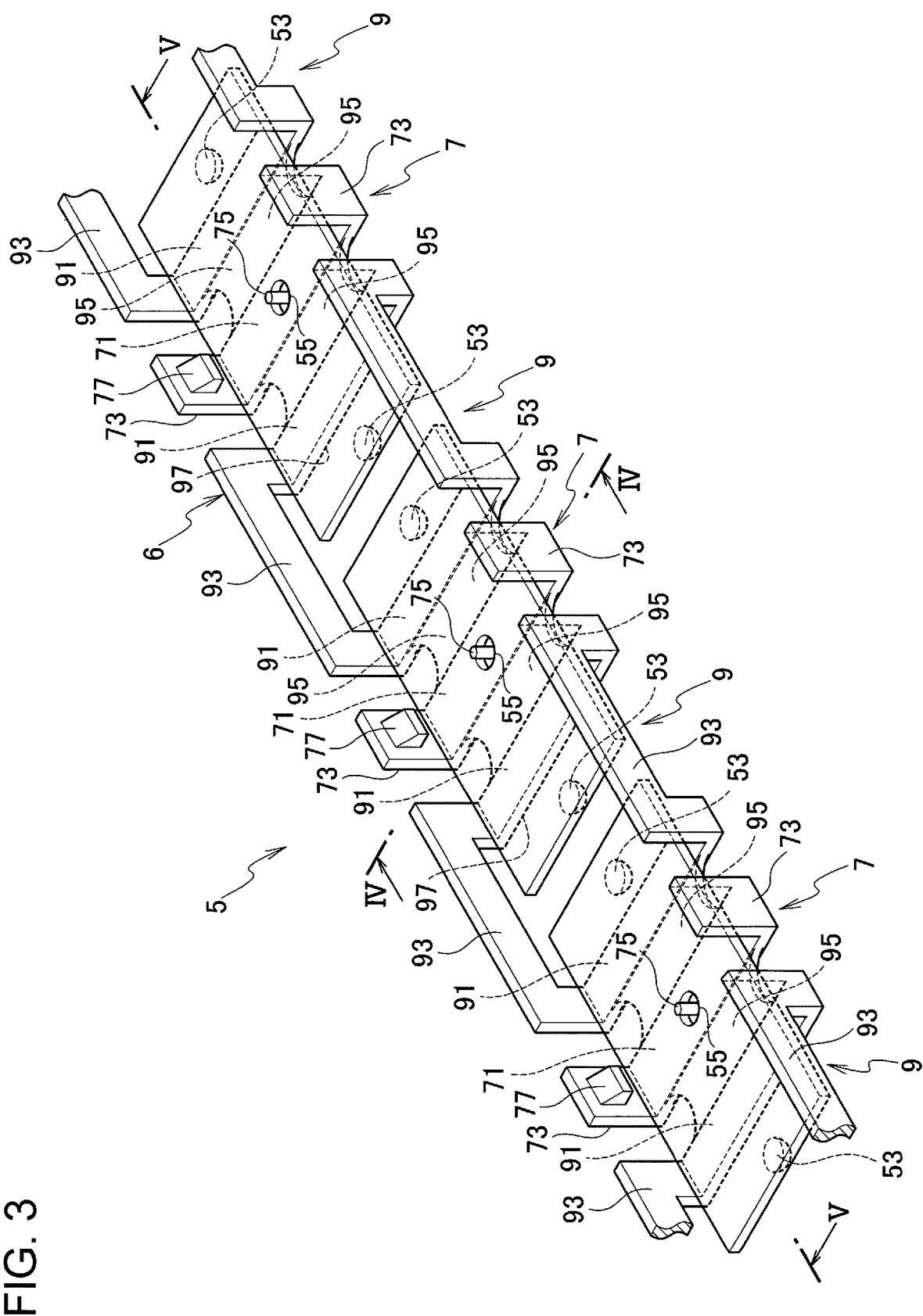
FIG. 3 is a perspective view of a bus bar module according to a first embodiment of the present invention used for a battery pack in FIG. 1.

First, the bus bar module 5 according to a first embodiment of the present invention will be described. FIG. 3 is a perspective view of the bus bar module 5 according to the first embodiment of the present invention used for the battery pack 1 in FIG. 1.

As described above, the bus bar module 5 of the present embodiment is used for connection between the electrodes 35 on one end side in the longitudinal direction of the top surfaces of the battery cells 33 and for connection between the electrodes 35 on the other end side. Each bus bar module 5 has a bus bar holder 6 that holds a plurality of the bus bars 51. A guide hole 55 not illustrated in FIGS. 1 and 2 penetrates through the center of the bus bar 51.

The bus bar holder 6 is formed of an insulating material such as a synthetic resin. The bus bar holder 6 includes a plurality of holding portions 7 each holding each of the plurality of bus bars 51 and a plurality of coupling portions 9 coupling the holding portions 7 in a chain manner.

The holding portion 7 has a support plate 71 supporting the bus bar 51 and a pair of side walls 73 erected from the support plate 71.

The support plate 71 supports a central portion in the longitudinal direction of the bus bar 51. The portion of the bus bar 51, the portion being supported by the support plate 71, does not include the contact portions 53 of the bus bar 51 but includes a peripheral edge portion of the guide hole 55. A positioning pin 75 (movement restricting member) erects on the support plate 71. The positioning pin 75 is loosely inserted into the guide hole 55 of the bus bar 51 supported by the support plate 71.

Since the positioning pin 75 is loosely inserted in the guide hole 55 of the bus bar 51, movement of the bus bar 51 in a direction along the support plate 71 is restricted within a predetermined range. Specifically, the bus bar 51 having the positioning pin 75 loosely inserted in the guide hole 55 can move in the direction along the support plate 71 by an amount corresponding to a gap formed between the guide hole 55 and the positioning pin 75. That is, the bus bar 51 having the positioning pin 75 loosely inserted in the guide hole 55 can move in the direction along the support plate 71 within a range where the positioning pin 75 remains inside the guide hole 55.

In other words, the support plate 71 holds the bus bar 51 to be movable within a predetermined range determined by restriction of movement (movement in a direction in which the positioning pin 75 is away from the center of the guide hole 55) of the bus bar 51 by an interference with the positioning pin 75.

The side walls 73 respectively extend outside both long sides of the bus bar 51 supported by the support plate 71.

Figure 4:
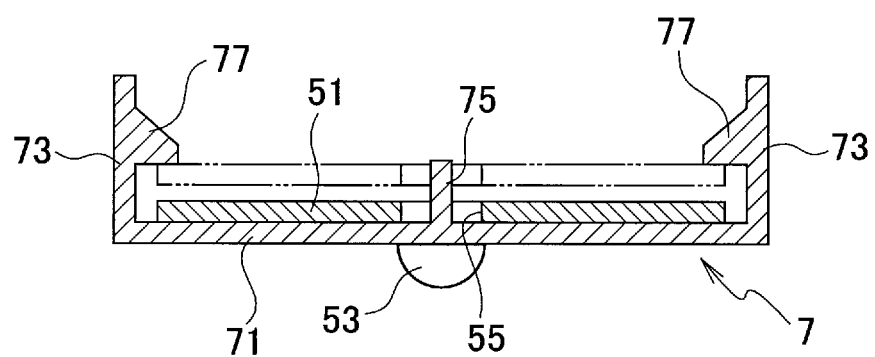
FIG. 4 is a cross-sectional view taken along line IV-IV of the bus bar module in FIG. 3.

Locking protrusions 77 (protrusions and the movement restricting member) are respectively formed on inner surfaces facing each other, of the side walls 73, as illustrated in FIG. 4 that is a cross-sectional view taken along line IV-IV of FIG. 3.

The locking protrusion 77 of each side wall 73 restricts movement of the bus bar 51 toward a top of the side wall 73 beyond a tip end of the positioning pin 75, the bus bar 51 having climbed over the locking protrusion 77 from the top of the side wall 73 and moved toward the support plate 71. This restriction prevents the positioning pin 75 from coming out of the guide hole 55 and the bus bar 51 from being freely movable in the longitudinal direction with respect to the holding portion 7.

In other words, the support plate 71 holds the bus bar 51 to be movable within a predetermined range determined by restriction of movement (movement in an extending direction of the positioning pin 75) of the bus bar 51 by an interference with the locking protrusion 77.

Further, the locking protrusion 77 of each side wall 73 is formed at a position allowing a gap to be provided between the locking protrusion 77 and the bus bar 51 on the support plate 71, the gap allowing inclination of the bus bar 51 with respect to the support plate 71. Therefore, the bus bar 51 on the support plate 71 can take a posture inclined with respect to the support plate 71 in the gap between the bus bar 51 and the locking protrusion 77.

As illustrated in FIG. 3, the coupling portion 9 includes a pair of abutting portions 91 and 91 respectively abutting on the bus bars 51 and 51 held by the two adjacent holding portions 7 and 7, a pair of connecting walls 93 and 93 connecting the abutting portions 91 and 91, and coupling pieces 95 and 95 connecting the coupling portion 9 to the holding portions 7.

Each abutting portion 91 abuts on a portion between the contact portion 53 and the guide hole 55 in the longitudinal direction of the two adjacent bus bars 51.

Each connecting wall 93 connects side portions of the abutting portions 91 respectively abutting on the two adjacent bus bars 51 in a short side direction of the bus bars 51. The connecting walls 93 extend outside long sides of the bus bars 51 on which the abutting portions 91 abut, and are arranged between the side walls 73 of the two adjacent holding portions 7.

Each coupling piece 95 connects each abutting portion 91 and the support plate 71 of the holding portion 7 adjacent to the coupling portion 9. Each coupling piece 95 is formed to be thinner than the abutting portion 91 and the support plate 71, and is configured to be deformable so that a relative angle (an elevation angle or a depression angle) between the abutting portion 91 and the support plate 71 becomes variable.

In other words, the two adjacent holding portions 7 and 7 are coupled in a chain manner by the coupling portion 9 arranged between the holding portions 7 in a state where the relative angle (the elevation angle or the depression angle) with an adjacent holding portion 7 can be changed by deformation of the coupling pieces 95 and 95 on both sides of the abutting portions 91.

Then, the coupling portion 9 is formed in a rectangular frame shape by the pair of abutting portions 91 and 91 and the pair of connecting walls 93 and 93. Therefore, the coupling portion 9 has a rectangular opening 97 inside the pair of abutting portions 91 and 91 and the pair of connecting walls 93 and 93. Inside the opening 97, portions on the side of the contact portions 53 of the bus bars 51 abutting on the abutting portions 91 are arranged.

Next, assembling work in the case of electrically connecting the electrodes 35 of the battery cells 33 of the battery module 3 by the bus bar module 5 of the present embodiment configured as described above will be described.

First, the bus bar 51 is brought to be fit between the pair of side walls 73 of each holding portion 7 of the bus bar holder 6, thereby to be held by the holding portion 7. At this time, the bus bar 51 is supported by the support plate 71 by causing the bus bar 51 to climb over the locking protrusions 77 of the side walls 73 while inserting the positioning pin 75 of the support plate 71 into the guide hole 55 of the bus bar 51.

Next, the bus bar holder 6 having the holding portions 7 hold the bus bars 51 is placed on the electrodes 35 on the one end side and the electrodes 35 on the other end sides in the longitudinal direction on the top surfaces of the battery cells 33. Then, the bus bars 51 of the holding portions 7 moves toward the top surfaces of the battery cells 33 by its own weight.

When the bus bars 51 and the holding portions 7 move toward the battery cells 33, the coupling pieces 95 of the coupling portion 9 are deformed in accordance with the variation in height of the electrodes 35 of the battery cells 33. Then, the relative angle (the elevation angle or the depression angle) of the two adjacent holding portions 7 connected by the coupling portion 9 is adjusted.

Further, the bus bar 51 held by each holding portion 7 moves in the direction along the support plate 71 within the range of the gap between the guide hole 55 and the positioning pin 75, and further moves in the direction along the positioning pin 75 between the support plate 71 and the locking protrusion 77 to the position of the posture where the corresponding contact portions 53 come in to contact with the electrodes 35 of the two adjacent battery cells 33.

Then, the contact portions 53 and 53 of two adjacent bus bars 51 and 51 arranged inside the opening 97 of the coupling portion 9 are respectively brought into contact with and adhere to the electrodes 35 and 35 of the two adjacent battery cells 33 and 33.

In a case where the bus bar 51 and holding portion 7 do not move toward the battery cells 33, the bus bar 51 on the holding portion 7 of the bus bar holder 6 placed on the electrodes 35 of the battery cells 33 is simply pressed against the top surfaces of the battery cells 33.

Figure 5:
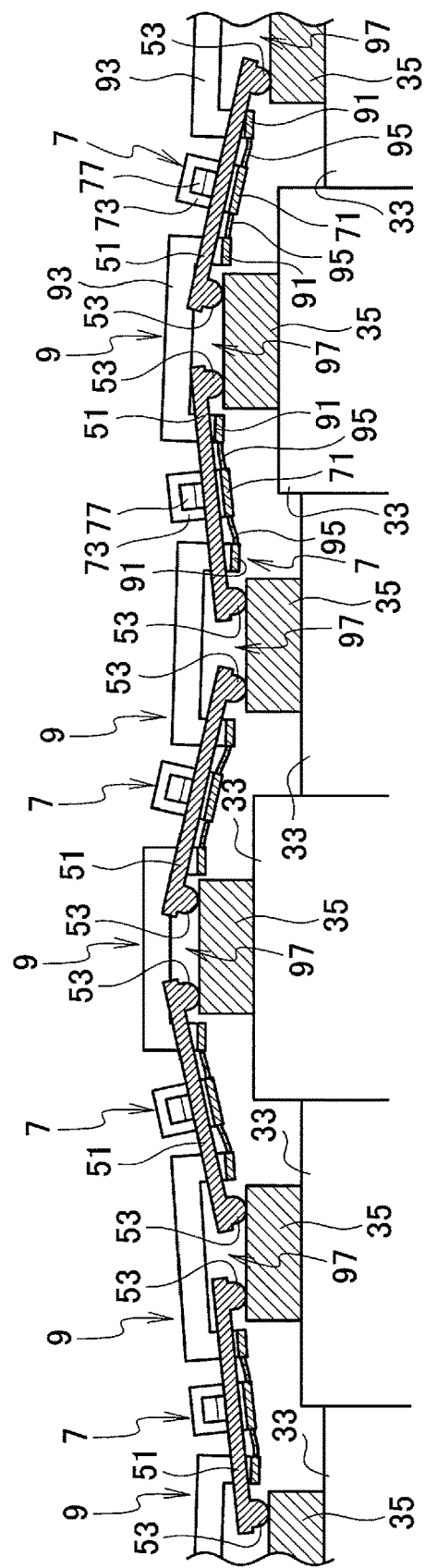
FIG. 5 is a cross-sectional view taken along line V-V of the bus bar module in FIG. 3.

As a result, the electrodes 35 and 35 of the two adjacent battery cells 33 and 33 are in an electrically connected state with an appropriate low contact resistance by the bus bar 51 having the contact portions 53 and 53 adhering to the electrodes 35, as illustrated in FIG. 5 that is the cross-sectional view taken along line V-V of FIG. 3.

Figure 6:
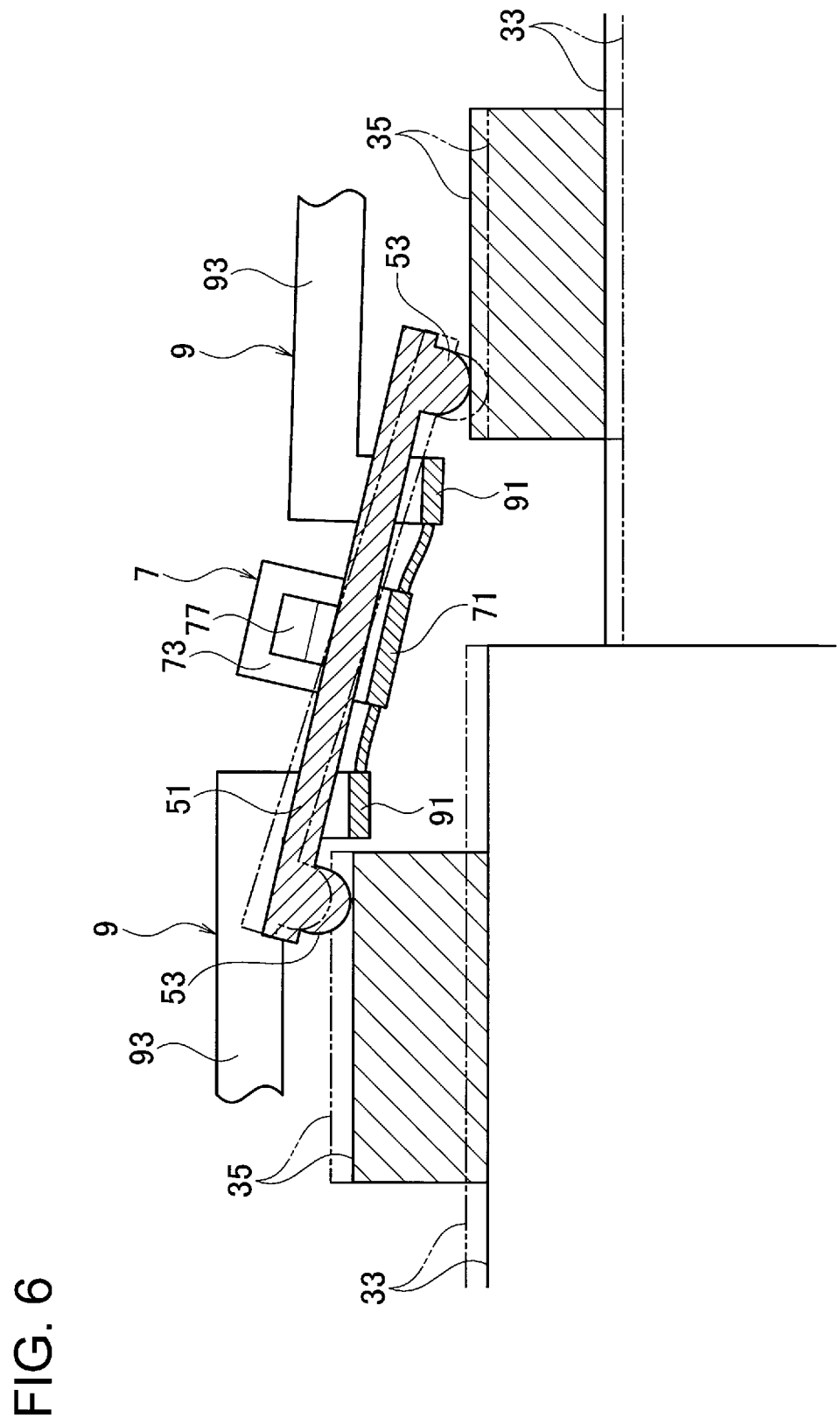
FIG. 6 is an enlarged explanatory view illustrating a posture in a holding portion of a bus bar holder of a bus bar connecting electrodes of two adjacent battery cells in FIG. 5.

Then, as illustrated in the explanatory view in FIG. 6 illustrating an enlarged state of the electrodes 35 and 35 of the two adjacent battery cells 33 and 33 by the bus bar 51 in FIG. 5, the locking protrusion 77 of each side wall 73 is formed at a position allowing the gap provided between the locking protrusion 77 and the bus bar 51 on the support plate 71, the gap allowing inclination of the bus bar 51 with respect to the support plate 71. Therefore, the bus bar 51 on the support plate 71 can take a posture inclined with respect to the support plate 71 in the gap between the bus bar 51 and the locking protrusion 77.

Note that the contact portion 53 of the bus bar 51 adhering to the electrode 35 can be fixed to the electrode 35 in a firmly stacked state by welding the contact portion 53 to the electrode 35 or by applying a pressing force to each bus bar 51 toward the electrode 35 using fastening parts such as bolts (not illustrated).

As described above, in the bus bar module 5 of the present embodiment, the bus bar holder 6 in which the plurality of holding portion 7 each holding the bus bar 51 is coupled in a chain manner by the thin coupling portions 9 is brought close to the electrodes 35 of the battery cells 33 to cause the coupling pieces 95 of the coupling portions 9 to be deformed in accordance with the variation in height of the electrodes 35 of the battery cells 33.

Further, the bus bar 51 held by each holding portion 7 is brought to move in the direction along the support plate 71 within the range of the gap between the guide hole 55 and the positioning pin 75, and is further brought to move in the direction along the positioning pin 75 between the support plate 71 and the locking protrusion 77 to the position of the posture where the contact portions 53 come into contact with the electrodes 35 of the two adjacent battery cells 33.

Therefore, the contact portions 53 of the bus bars 51 arranged inside the openings 97 of the two adjacent coupling portions 9 are respectively brought into contact with and adhere to the electrodes 35 and 35 of the two adjacent battery cells 33 and 33. That is, the coupling portions of the bus bar holder are deformed, and the bus bar moves inside the holding portion within the predetermined ranges determined by restriction of movement of the bus bar in the holding portion by interferences with the movement restricting members, whereby each bus bar is set to the posture at which the contact portions are in contact with the electrodes of the two adjacent battery cells connected by the bus bar in each holding portion.

Therefore, even when there is variation within the tolerance in height of the electrodes 35 of the battery cells 33, the contact portions 53 of the bus bars 51 can be collectively arranged at positions in contact with the corresponding electrodes 35 of the battery cells 33 all at once by bringing the bus bar holder 6 close to the electrodes 35 of the battery cells 33 of the battery module 3. In other words, even when there is variation in positions of the electrodes of the battery cells due to dimensional errors within the tolerance of many battery cells constituting the battery module, the contact portions of the bus bars held by the holding portions of the bus bar holder are collectively assembled to the positions in contact with the corresponding electrodes of the battery cells all at once.

As a result, adhesiveness of the bus bars 51 to the electrodes 35 of the battery cells 33 having variation in the positions can be secured without impairing the assemblability of the bus bars 51 to the electrodes 35 of the many battery cells 33, even when the short bus bar 51 connecting the electrodes 35 of the two adjacent battery cells 33 is used.

Further, the gap allowing the bus bar 51 to take an inclined posture with respect to the support plate 71 is formed between the locking protrusion 77 and the bus bar 51 on the support plate 71. Therefore, the degree of freedom of the posture of the bus bar 51 in the holding portion 7 is increased, and the adhesiveness of the bus bar 51 to the electrodes 35 and 35 of the two battery cells 33 and 33 having variation in height can be further enhanced.

In other words, the bus bar can take an inclined posture with respect to the support plate in the gap between the bus bar on the support plate and the movement restricting member, thereby to increase the degree of freedom of the posture of the bus bar in the holding portion, and enhance the adhesiveness of the bus bar to the electrodes of the battery cells having variation in positions.

Figure 7:
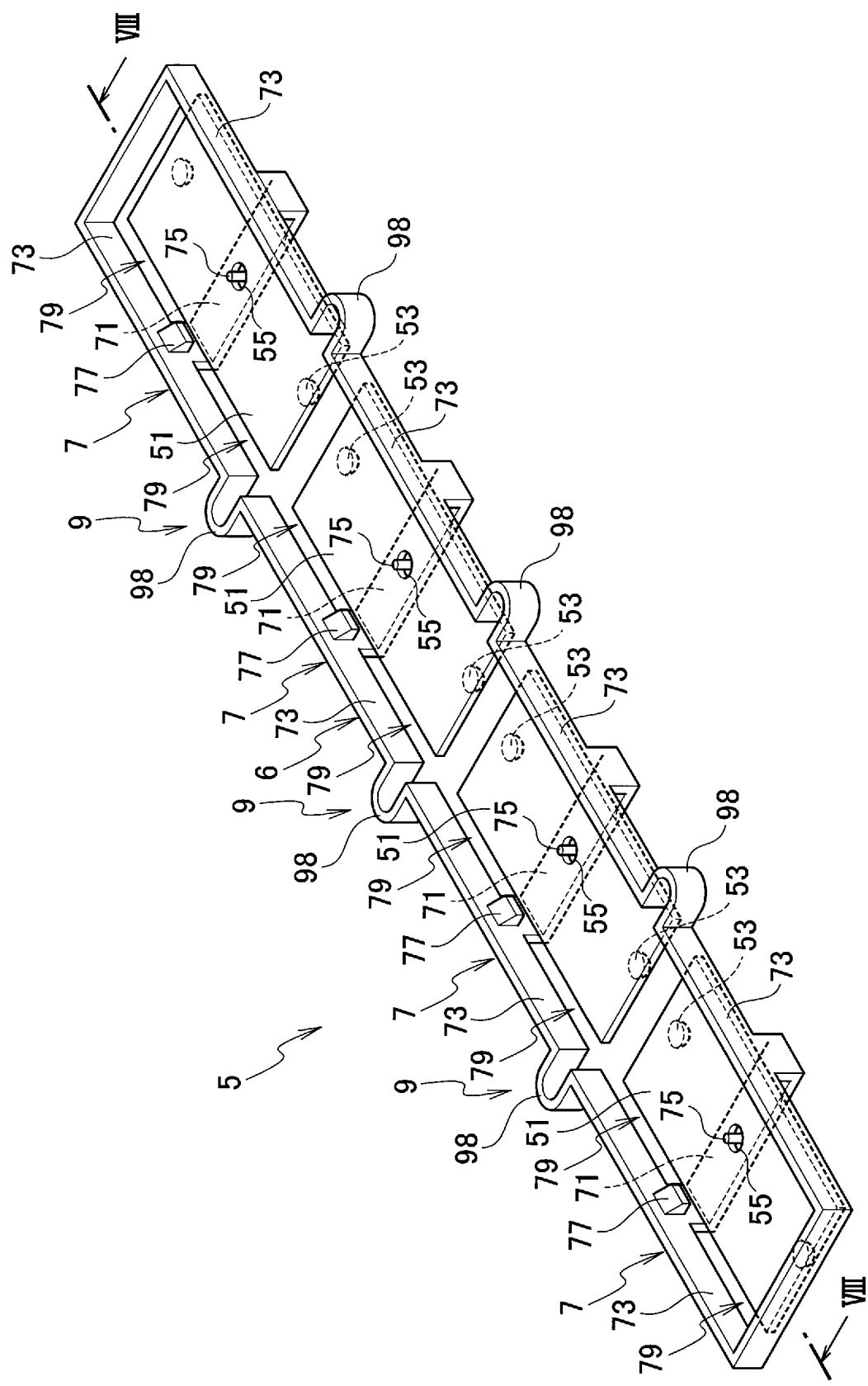
FIG. 7 is a perspective view of a bus bar module according to a second embodiment of the present invention used for a battery pack in FIG. 1.

Next, a bus bar module 5 according to a second embodiment of the present invention will be described. FIG. 7 is a perspective view of the bus bar module 5 according to the second embodiment of the present invention used for a battery pack 1 in FIG. 1.

In a bus bar holder 6 of the bus bar module 5 of the present embodiment, each of a pair of side walls 73 and 73 of each holding portion 7 has a dimension larger than a long side of a bus bar 51 in a longitudinal direction of the bus bar 51 supported by a support plate 71. Then, an opening 79 is formed inside both the side walls 73 and the support plate 71 of each holding portion 7. Portions (including contact portions 53) of the bus bar 51 on end portion sides in the longitudinal direction, excluding a portion supported by the support plate 71, are arranged inside the opening 79.

Further, in the bus bar holder 6 of the present embodiment, each coupling portion 9 coupling the holding portions 7 in a chain manner is constituted by only flexible curved pieces 98 connecting the side walls 73 of two adjacent holding portions 7. This curved piece 98 is constituted such that the two adjacent holding portions 7 can be deformed into a direction to change a relative angle (an elevation angle or a depression angle) of the two holding portions 7.

In these respects, the bus bar holder 6 of the bus bar module 5 of the present embodiment is different in configuration from the bus bar holder 6 of the bus bar module 5 of the first embodiment.

In the bus bar module 5 of the present embodiment constituted as described above, the bus bar holder 6 having the holding portions 7 hold the bus bars 51 is placed on electrodes 35 on one end side and on electrodes 35 on the other end side in the longitudinal direction on top surfaces of battery cells 33, similarly to the bus bar module 5 of the first embodiment.

Then, the contact portions 53 of the bus bars 51 are brought into contact with the corresponding electrodes 35 of the battery cells 33 by its own weight of the bus bars 51 and the holding portions 7 or by pressing the bus bars 51 of the holding portions 7 against the top surfaces of the battery cells 33.

Figure 8:
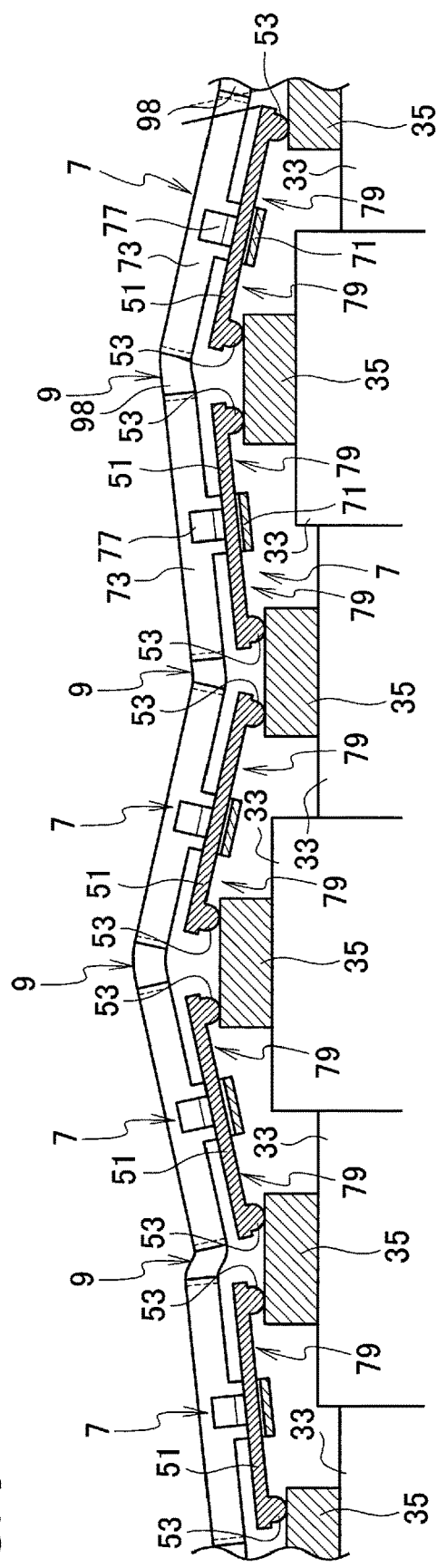
FIG. 8 is a cross-sectional view taken along line VIII-VIII of the bus bar module in FIG. 7.

As a result, the electrodes 35 and 35 of the two adjacent battery cells 33 and 33 become in an electrically connected state by the bus bar 51 having the contact portions 53 and 53 be in contact with the electrodes 35, as illustrated in FIG. 8 that is the cross-sectional view taken along line VIII-VIII of FIG. 7.

As described above, in the bus bar module 5 of the present embodiment, the bus bar holder 6 in which the plurality of holding portion 7 each holding the bus bar 51 is coupled in a chain manner by the coupling portions 9, that is, by the thin curved pieces 98, is brought close to the electrodes 35 of the battery cells 33 to cause the curved pieces 98 of the coupling portions 9 to be deformed in accordance with the variation in height of the electrodes 35 of the battery cells 33.

Figure 9:
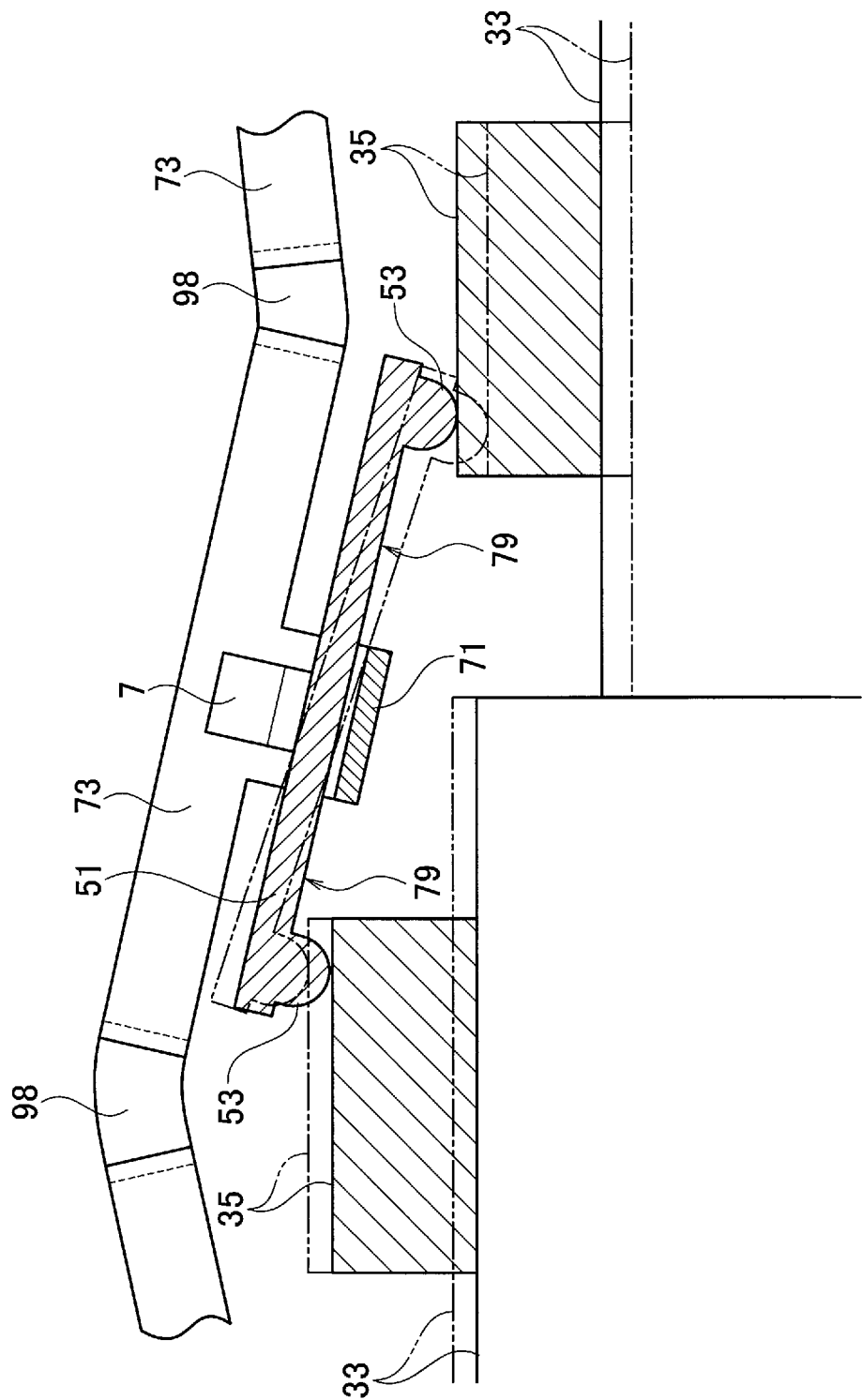
FIG. 9 is an enlarged explanatory view illustrating a posture in a holding portion of a bus bar holder of a bus bar connecting electrodes of two adjacent battery cells in FIG. 8.

Then, as illustrated in the explanatory view in FIG. 9 illustrating an enlarged state of the electrodes 35 and 35 of the two adjacent battery cells 33 and 33 by the bus bar 51 in FIG. 8, the locking protrusion 77 of each side wall 73 is formed at a position allowing the gap provided between the locking protrusion 77 and the bus bar 51 on the support plate 71, the gap allowing inclination of the bus bar 51 with respect to the support plate 71. Therefore, the bus bar 51 on the support plate 71 can take a posture inclined with respect to the support plate 71 in the gap between the bus bar 51 and the locking protrusion 77.

Further, the bus bar 51 held by each holding portion 7 is brought to move in the direction along the support plate 71 within the range of the gap between the guide hole 55 and the positioning pin 75, and is further brought to move in the direction along the positioning pin 75 between the support plate 71 and the locking protrusion 77 to the position of the posture where the contact portions 53 come into contact with the electrodes 35 of the two adjacent battery cells 33.

Therefore, the contact portions 53 of the bus bar 51 arranged inside the opening 79 located on both sides of the support plate 71 in the longitudinal direction of the bus bar 51 supported by the support plate 71 are respectively brought into contact with and adhere to the electrodes 35 of the two adjacent battery cells 33.

In other words, the bus bar becomes movable in an extending direction of the support plate with respect to the holding portion within a range of a gap between a positioning pin and a guide hole of the bus bar on the support plate, thereby to increase the degree of freedom of the posture of the bus bar in the holding portion, and enhance the adhesiveness of the bus bar to the electrodes of the battery cells having variation in positions.

With the bus bar module 5 of the present embodiment thus configured, an effect similar to the effect of the bus bar module 5 of the first embodiment can be obtained.

Note that the opening through which the contact portion 53 of the bus bar 51 is exposed to the electrode 35 of the battery cell 33 as in the bus bar holder 6 of each embodiment may be provided in either of the holding portion 7 and the coupling portion 9.

Further, the configuration to restrict the moving range of the bus bar 51 with respect to the holding portion 7, that is, the movement restricting member is not limited to the combination of the positioning pin 75 of the support plate 71 of the holding portion 7 and the locking protrusions 77 of the side walls 73, as in the bus bar holder 6 of each embodiment, and may be either of the positioning pin 75 and the locking protrusions 77. Alternatively, an arbitrary configuration can be used as the movement restricting member in place of the positioning pin 75 and the locking protrusions 77.

Furthermore, a battery pack of the present embodiment may include a battery module constituted by a large number of battery cells and the bus bar module as described above. With the configuration, the battery pack can exhibit the effect obtained by the bus bar module.

This application claims priority based on Japanese Patent Application No. 2018-046458 filed on Mar. 14, 2018, the entire contents of which is hereby incorporated in the present specification by reference.

The present invention is extremely useful when used for a battery pack in which terminals of a plurality of battery cells are connected by a bus bar module.

REFERENCE SIGNS LIST 1 battery pack
3 battery module
5 bus bar module
6 bus bar holder
7 holding portion
9 coupling portion
31 unit cell
33 battery cell
35 electrode
51 bus bar
53 contact portion
55 guide hole
71 support plate (central portion of bottom of holding portion)
73 side wall
75 positioning pin (movement restricting member)
77 locking protrusions (protrusion and the movement restricting member)
79, 97 opening
91 abutting portion
93 connecting wall
95 coupling piece
98 curved piece

What is claimed is:

1. A bus bar module comprising:
a plurality of bus bars each connecting electrodes of two adjacent battery cells of a plurality of battery cells constituting a battery module; and
a bus bar holder constituted by coupling a plurality of holding portions in a chain manner via deformable coupling portions, respectively, the plurality of holding portions each holding one of the plurality of bus bars in a movable manner within a predetermined range determined by restriction of movement of the bus bar by an interference with a movement restricting member, and having openings each allowing two contact portions of adjacent bus bars held by the respective holding portions to be exposed to an outside, the two contact portions being respectively connected to the electrodes of the two adjacent battery cells.

2. The bus bar module according to claim 1, wherein
each holding portion includes a support plate that supports a portion of the bus bar except the contact portions, and a pair of side walls erecting from the support plate, extending on both sides of the bus bar, and facing each other, and
the movement restricting member of each holding portion includes a pair of protrusions projecting from facing surfaces of the side walls, respectively, and the bus bar that has climbed over the pair of protrusions, has moved toward the support plate, and has been held by the holding portion, is movably held between the support plate and the pair of protrusions.

3. The bus bar module according to claim 2, wherein
at least one of the coupling portions is connected to the support plate, and the at least one of the coupling portions is arranged in a place facing a portion between the two contact portions of the adjacent bus bars held by the respective holding portions.

4. The bus bar module according to claim 2, wherein
the movement restricting member of each holding portion is arranged at a position allowing a gap to be provided between the movement restricting member and the bus bar on the support plate, the gap allowing inclination of the bus bar with respect to the support plate.

5. The bus bar module according claim 1, wherein
each holding portion includes a support plate that supports a portion of the bus bar except the contact portions, the movement restricting member of each holding portion includes a positioning pin projecting from the support plate and loosely inserted in a guide hole in the bus bar on the support plate, and the bus bar is movably held along the support plate until the guide hole abuts against the positioning pin.

6. The bus bar module according to claim 1, wherein, along a longitudinal direction of each bus bar, the movement restricting member of each holding portion is directly between two contact portions of the bus bar.

7. The bus bar module according to claim 1, wherein the bus bar holder is configured such that the two contact portions of the adjacent bus bars directly face each other in each opening.

8. A battery pack comprising:
a battery module constituted by a plurality of battery cells; and
the bus bar module according to claim 1.

* * * * *